(12) United States Patent
Shet et al.

(10) Patent No.: US 11,567,962 B2
(45) Date of Patent: Jan. 31, 2023

(54) COMPUTER NETWORK CONTROLLED DATA ORCHESTRATION SYSTEM AND METHOD FOR DATA AGGREGATION, NORMALIZATION, FOR PRESENTATION, ANALYSIS AND ACTION/DECISION MAKING

(71) Applicant: TAASCOM INC., San Jose (SG)

(72) Inventors: Sanjiv Shrikant Shet, Bangalore (IN); Ranga Raj, Bangalore (IN); Teck Lee Low, Singapore (SG)

(*) Notice: Subject to any disclaimer, the term of this patent is extended or adjusted under 35 U.S.C. 154(b) by 949 days.

(21) Appl. No.: 14/797,091

(22) Filed: Jul. 11, 2015

(65) Prior Publication Data
US 2017/0011107 A1   Jan. 12, 2017

(51) Int. Cl.
*G06F 16/25* (2019.01)
*G06F 16/26* (2019.01)
(Continued)

(52) U.S. Cl.
CPC ......... *G06F 16/258* (2019.01); *G06F 16/25* (2019.01); *G06F 16/26* (2019.01); *G06F 16/284* (2019.01);
(Continued)

(58) Field of Classification Search
CPC ......... G06F 17/30569; G06F 17/30557; G06F 17/30572; G06F 17/30595; G06F 16/258;
(Continued)

(56) References Cited

U.S. PATENT DOCUMENTS 5,471,617 A * 11/1995 Farrand ............... G06F 11/0748
709/223
5,802,146 A * 9/1998 Dulman ............... H04M 3/2254
379/120
(Continued)

FOREIGN PATENT DOCUMENTS

WO   2002035395   5/2002
WO   2015006044   1/2015

OTHER PUBLICATIONS

David Carasso, "Exploring Splunk", 2012, CITO Research (Year: 2012).*
(Continued)

*Primary Examiner* — Irete F Ehichioya
*Assistant Examiner* — Huen Wong
(74) *Attorney, Agent, or Firm* — Michael D. Eisenberg

(57) ABSTRACT

Embodiments disclosed include a platform for collecting, normalizing, aggregating, and presenting/processing data over a wide range of devices, machines and applications in real-time, in a wired or wireless networked framework. An embodiment includes a computer automated system and method for aggregating data from a plurality of devices and applications. Embodiments disclosed further include a system and method for normalizing data from a plurality of devices and applications, for canonical-izing all normalized and aggregated data, and via a graphical user interface, combining the aggregated and normalized data, and displaying the combined data in a display compatible format. The computer system is further configured to abstract a plurality of classes of devices via a data modeling language comprised in the configuration of the computer system.

22 Claims, 4 Drawing Sheets

(51) Int. Cl.
*G06F 16/28* (2019.01)
*G06N 20/00* (2019.01)
*G06Q 30/06* (2012.01)
*G06Q 10/00* (2012.01)

(52) U.S. Cl.
CPC ............ *G06N 20/00* (2019.01); *G06Q 10/00* (2013.01); *G06Q 30/06* (2013.01)

(58) Field of Classification Search
CPC ........ G06F 16/26; G06F 16/284; G06F 16/25; G06N 20/00; G06Q 10/00; G06Q 30/06
See application file for complete search history.

(56) References Cited

U.S. PATENT DOCUMENTS

| | | | | |
|---|---|---|---|---|
| 6,009,431 | A * | 12/1999 | Anger | H04L 41/0213 707/741 |
| 6,714,977 | B1 * | 3/2004 | Fowler | H04L 12/2825 700/83 |
| 7,257,583 | B2 | 8/2007 | Hofmeister | G06F 8/61 |
| 8,195,690 | B2 * | 6/2012 | Hou | G06F 16/8358 707/774 |
| 8,266,064 | B1 * | 9/2012 | Kumar | H04N 21/2543 705/64 |
| 8,825,515 | B1 * | 9/2014 | Hanson | H04L 65/403 705/7.32 |
| 8,887,146 | B2 * | 11/2014 | Hido | G06F 21/566 717/168 |
| 9,710,752 | B2 * | 7/2017 | Salajegheh | G06F 11/3452 |
| 9,747,440 | B2 * | 8/2017 | Gupta | H04L 63/1425 |
| 2002/0013840 | A1 * | 1/2002 | Border | H04B 7/18582 709/224 |
| 2002/0045808 | A1 * | 4/2002 | Ford | G06F 19/322 600/347 |
| 2002/0124081 | A1 * | 9/2002 | Primm | H04L 29/06 709/224 |
| 2002/0161990 | A1 * | 10/2002 | Zhang | G06F 8/61 713/1 |
| 2003/0036873 | A1 * | 2/2003 | Sierer | G06Q 20/10 702/123 |
| 2003/0074432 | A1 * | 4/2003 | Mazzitelli | H04L 29/06 709/223 |
| 2003/0140007 | A1 * | 7/2003 | Kramer | G06Q 20/04 705/40 |
| 2004/0015583 | A1 * | 1/2004 | Barrett | H04L 41/22 709/224 |
| 2004/0117839 | A1 * | 6/2004 | Watson | H04L 65/80 725/87 |
| 2005/0038674 | A1 * | 2/2005 | Braig | G06F 19/322 705/2 |
| 2005/0096035 | A1 * | 5/2005 | Haberman | H04W 4/00 455/422.1 |
| 2006/0052945 | A1 | 3/2006 | Rabinowitz et al. | |
| 2006/0087408 | A1 * | 4/2006 | Korzeniowski | H04L 67/22 340/286.02 |
| 2007/0261097 | A1 * | 11/2007 | Siegman | G06F 3/023 725/134 |
| 2008/0301135 | A1 * | 12/2008 | Alves | G06F 16/2453 |
| 2009/0070783 | A1 | 3/2009 | Schmidt et al. | |
| 2009/0157622 | A1 * | 6/2009 | Roberts | G06F 19/327 |
| 2009/0319531 | A1 * | 12/2009 | Ko | H04L 43/0817 |
| 2010/0036811 | A1 * | 2/2010 | Vassa | G16H 40/20 455/456.3 |
| 2010/0114899 | A1 | 5/2010 | Guha et al. | |
| 2011/0055226 | A1 | 3/2011 | Martino et al. | |
| 2011/0225081 | A1 * | 9/2011 | Kittelsen | G06Q 40/04 705/37 |
| 2011/0288692 | A1 * | 11/2011 | Scott | G06F 21/55 700/297 |
| 2012/0116590 | A1 * | 5/2012 | Florez-Larrahondo | G06F 1/206 700/275 |
| 2012/0253847 | A1 * | 10/2012 | Dell'Anno | A61B 5/0022 705/3 |
| 2013/0191165 | A1 | 7/2013 | MacDonald et al. | |
| 2014/0181085 | A1 | 6/2014 | Gokhale et al. | |
| 2014/0200989 | A1 | 7/2014 | Cohen Kassko et al. | |
| 2014/0337328 | A1 * | 11/2014 | Sarvabhotla | G06F 17/30867 707/723 |
| 2014/0337429 | A1 | 11/2014 | Asenjo et al. | |
| 2014/0359008 | A1 * | 12/2014 | Finney | G06Q 50/01 709/204 |
| 2015/0033084 | A1 * | 1/2015 | Sasturkar | G06F 11/0709 714/46 |
| 2015/0195356 | A1 * | 7/2015 | Kim | H04W 4/18 709/217 |
| 2015/0212126 | A1 * | 7/2015 | Harding | G01R 19/2513 707/756 |
| 2015/0213631 | A1 * | 7/2015 | Vander Broek | G06F 16/2477 345/589 |
| 2015/0264028 | A1 * | 9/2015 | Kim | H04L 43/08 726/3 |
| 2015/0348083 | A1 * | 12/2015 | Brill | G06Q 20/386 705/14.23 |
| 2016/0125490 | A1 * | 5/2016 | Angal | G06Q 30/0603 705/26.35 |
| 2016/0277443 | A1 * | 9/2016 | Anantharaju | H04L 63/1483 |
| 2016/0378168 | A1 * | 12/2016 | Branover | G06F 1/3243 713/323 |
| 2017/0011105 | A1 * | 1/2017 | Shet | G06Q 10/00 |

OTHER PUBLICATIONS

Maluf et al., "An Extensible Schema-less Database Framework for Managing High-Throughput Semi-Structured Documents", 2002, NASA Ames Research Center.*

* cited by examiner

COMPUTER NETWORK CONTROLLED DATA ORCHESTRATION SYSTEM AND METHOD FOR DATA AGGREGATION, NORMALIZATION, FOR PRESENTATION, ANALYSIS AND ACTION/DECISION MAKING

BACKGROUND

Field

This application relates to platforms for collecting, normalizing, aggregating, and presenting/processing data from and to a wide range of devices, machines and applications in a wired or wireless networked framework.

Related Art

As computerization and networked devices capable of communicating with each other have become all pervasive, this has resulted in a vast amount and number of disparate data sources. Data sources include sensors, devices, mobile devices, machines, applications, etc. Additionally, data sources comprise multiple vendors, varied models of the sensors, devices, mobile devices, machines and applications. Yet additionally, the devices are run by varied/different Operating Systems (OS), protocols etc. Further compounding the problem is a lack of standardization, wherein multiple vendors, models, operating systems, protocols, etc. make it impossible for seamless communication across device models and brands. Current solutions can and have addressed this. Addressing this challenge requires three key steps—1. Data collection, aggregation and normalization, 2. Analysis based on events, conditions, and trends across disparate data sources, and 3. Decision making/Actions to be taken, often as a return path or closed loop back to the machines/sensors and or other devices/applications.

However, today's systems offer sequential steps that are time consuming, wherein by the time a decision is taken, the data/conditions may have changed leading to wrong decisions. Further, solutions available are isolated solutions and tend to be silos of a single context, vendor, device type, machine type, application, etc.

There remains a need for automated, real-time, decision making, based on an analysis of conditions across multiple sources. There remains a further need in such an analysis for a correlation capability across the multiple sources. There also remains an additional need to perform such analysis, correlation, and decision making, in real-time, in an automated fashion. Embodiments disclosed address the above challenges.

SUMMARY

Embodiments disclosed include a platform for collecting, normalizing, aggregating, and presenting/processing data over a wide range of devices, machines and applications in real-time, in a wired or wireless networked framework.

An embodiment includes a computer automated system comprising a processing unit; a memory element coupled to the processing unit, a means for communicating over a network, and encoded instructions that configure the computer automated system to aggregate data from a plurality of devices and applications. The configuration further causes the system to normalize data from a plurality of devices and applications. The system is also configured to combine the aggregated and normalized data, and display the combined data in a display compatible format. And according to an embodiment, the computer system is further configured to abstract a plurality of classes of devices via a data modeling language comprised in the configuration of the computer system.

An embodiment includes a computer implemented method comprising aggregating data from a plurality of devices and applications in a data aggregation server capable of communicating and aggregating the said data over a wired or wireless network. The method further includes, in a data normalization engine, normalizing data from a plurality of devices and applications. And additionally, combining the aggregated and normalized data, and displaying the combined data in a display compatible format through a presentation platform comprising a graphical user interface. The method further includes abstracting a plurality of classes of devices via a data modeling language wherein the abstracting comprises abstracting at least one of medical CT scanners, medical MRI machines, printers, and UPS stations.

A mobile wireless communication device configured to, in real time, aggregate data from a plurality of data sources, wherein the said plurality of data sources comprise a single or plurality of proxy devices, legacy protocols, devices, applications, machines, sensors, things across locations and user types, or device clouds among devices and applications. The device is further configured to normalize data from the said plurality of data sources, and to analyze the aggregated, normalized data based on a correlated event or events, a correlated condition or conditions, and a correlated trend or trends across the plurality of data sources. Based on the analyzed data, the mobile device combines the aggregated and normalized data, and displays the combined data in a display compatible format. And according to an embodiment, the mobile device is further configured to abstract a plurality of classes of devices via a data modeling language comprised in the configuration of the mobile device, or accessed by the mobile device via a network.

DETAILED DESCRIPTION

Figure 1:
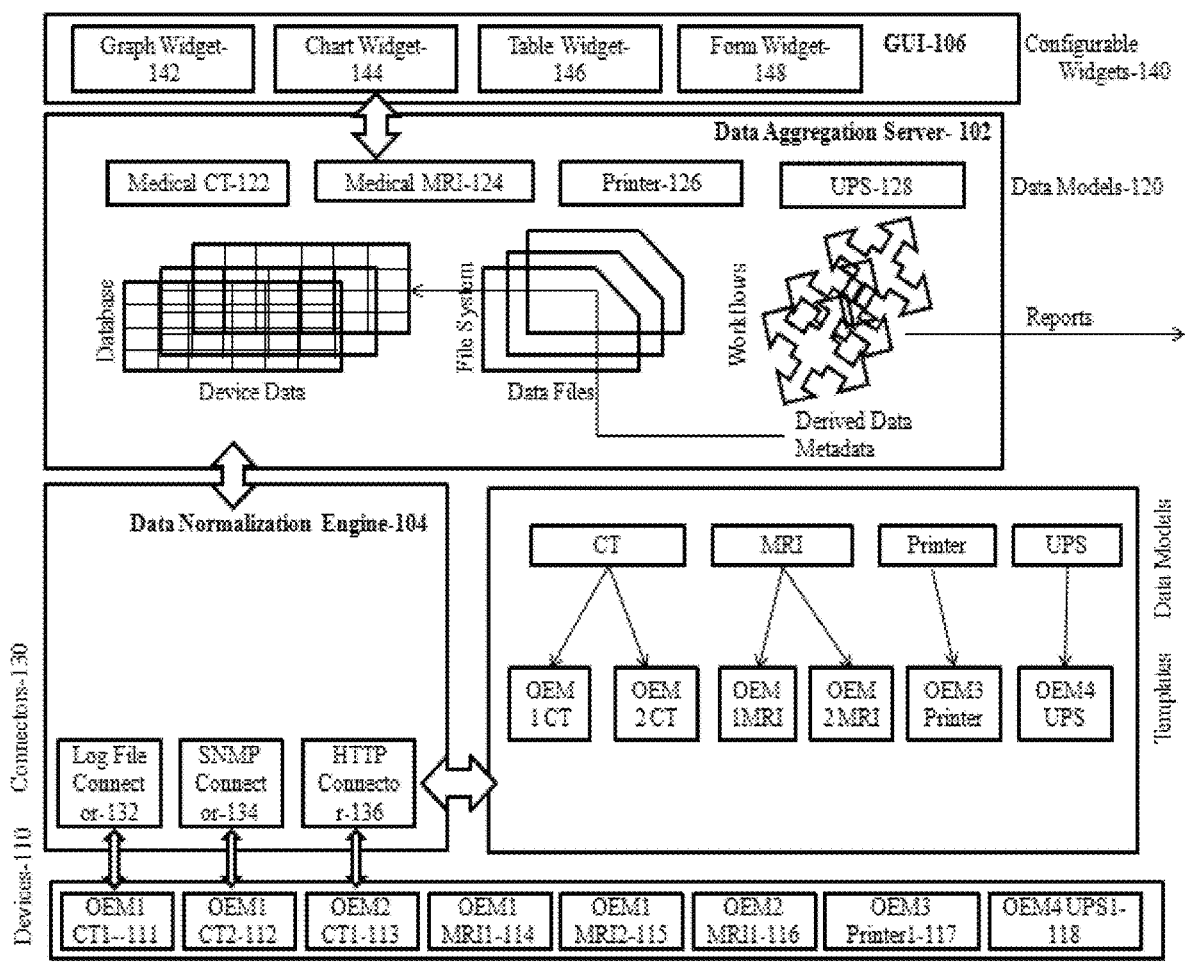
FIG. 1 illustrates the computer system according to an embodiment.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. In other instances, well-known features have not been described in detail to avoid obscuring the invention.

Embodiments disclosed include a platform for collecting, normalizing, aggregating, and presenting/processing data over a wide range of devices and applications.

An embodiment includes a computer automated system comprising a processing unit, a memory element coupled to the processing unit, and a means or capability for communicating over a network. FIG. 1 illustrates the computer system according to an embodiment. The computer automated system includes a data aggregation server 102, a data normalization engine 104, and a presentation platform comprising a graphical user interface 106. In the computer system the data aggregation server is configured to aggregate data from a plurality of devices 110 and applications, such as Medical CT scanners 122, Medical MRI machines, 124, Printers 126, Universal Power Supply (UPS) devices, 128, etc. The data normalization engine 104 is configured to normalize data from the said plurality of devices and applications. And the presentation platform is configured to combine the aggregated and normalized data, and display the combined data in a display compatible format.

According to an embodiment the computer system is further configured to abstract a plurality of classes of devices. This abstracting is done via a data modeling language comprised in the configuration of the computer system. The plurality of classes of devices can include medical CT scanners, medical MRI systems, printers, and UPS stations. The data-modeling language is used to create an abstract data-model for a device-class (e.g. Medical CT scanners, Medical MRI systems, Printers, UPS stations, etc.). The data-model contains a list of device-class parameters, their types, whether (say) read-only or read/write, and synchronous or asynchronous access and propagation, among other things. According to an embodiment, a template (or templates) is/are created to access data-model parameters for a particular device model. The template contains a mapping from the data-model parameters to one or more connectors, specifying the connector name, address/index within the connector space, and processing instructions to read/write each parameter in the data-model for the particular device model. Connectors for each data-access method such as a network protocol (e.g. SNMP connector 134, HTTP connector 136), or/and Log File connector 132, which can read/write device parameters based on information in the template for a particular device model can be used. Parameters for each device under management are either polled periodically or on-demand. In addition to periodic or on-demand polling, data can be collected from data sources, asynchronously.

Device data is collected using several methods. According to an embodiment, an embedded data collection stack resides on the device. The data collections stack interfaces directly with the device using the device application programming interface. In an alternate embodiment, the embedded data collection stack resides in a network gateway device. Here the data collections stack interfaces with the concerned device over the local area network using a network protocol supported by the concerned device. In some embodiments, the gateway device may be pre-loaded with the stack by the manufacturer, and proxy software that resides on and configures a computer in the IP network of the device. In yet another alternate embodiment, the data collection stack can be installed on a computer in the network by the network owner. Alternatively and additionally, it can be installed on an appliance that is inserted into the network. In the network is also a device cloud that can aggregate data for a single or plurality of types of devices, and devices. Data is collected from the device cloud database using the TCP/IP protocol or any other compatible equivalent protocol. An embodiment comprises a mobile application, or part of a mobile application that resides on and configures a mobile device, such that the data collection stack is activated when the mobile application executes. In some instances, the application can be a background process on the mobile device that runs continuously.

In the computer system, the data normalization engine further comprises a plurality of extensible connectors (such as Log File Connector 132, SNMP Connector 134, HTTP connector 136), which are used to extract at least one of log file data, SNMP data and HTTP data from each of a plurality of connected devices. Shown in FIG. 1 are devices 110, which include CT1 111, CT2 112, CT1 113, MRI1 114, MRI2 115, MRI 1 116, Printer1 117, and UPS1 118. Further the system is accordingly configured to map data-model parameters to variables in device models via a previously created plurality of templates. The said plurality of extensible connectors is further configured to extract the data model parameters mapped to the said variables in the said device models. Additionally, each device parameter is stored as a name value pair in a no-schema database.

According to an embodiment the computer automated system can be configured to canonical-ize all normalized and aggregated data. This canonicalization includes simplifying the data by adding Meta data and derived data to device data via a set of workflows. In some embodiments, for example when aggregating data from sources not routed through the Connectors and Normalization path, the workflows also normalize the data, if needed, before canonicalization. Further, via a plurality of re-configurable widgets 140, which can include Graph Widget 142, Chart Widget 144, Table Widget 146, Form Widget 148, etc. and via a data modeling language, the system can display device data in a plurality of different forms wherein the said plurality of different forms comprises at least one of a graph, a chart, and a table. Preferably, the said graph, chart and table are configured to show data relevant to each Device Class.

Presentation across platforms/devices—once the data is aggregated and normalized, it is stored in a schema-less data store. This allows any type of data as 'name-value' pairs, indexed by a unique identifier for each device. Access to this data is provided by web services, which are platform independent and can be consumed by any client application on any platform or device.

Abstraction of a plurality of classes of devices using a data modelling language—A data modelling language is used to capture all relevant information about a device class. This abstract data model represents a device class in general. All concrete manifestations of the device class (different models from different manufacturers) can be mapped onto the data model of the device class.

The data model representation itself is not specific to a device class. It is a general representation that can be used for any device class. It contains the names of the parameters of a device class, their value types, the unique device identifier, variables that can be used to identify the devices of that class, the protocols it responds to for the different variables both synchronous and asynchronous, and the frequency of polling for different variables.

Figure 2:
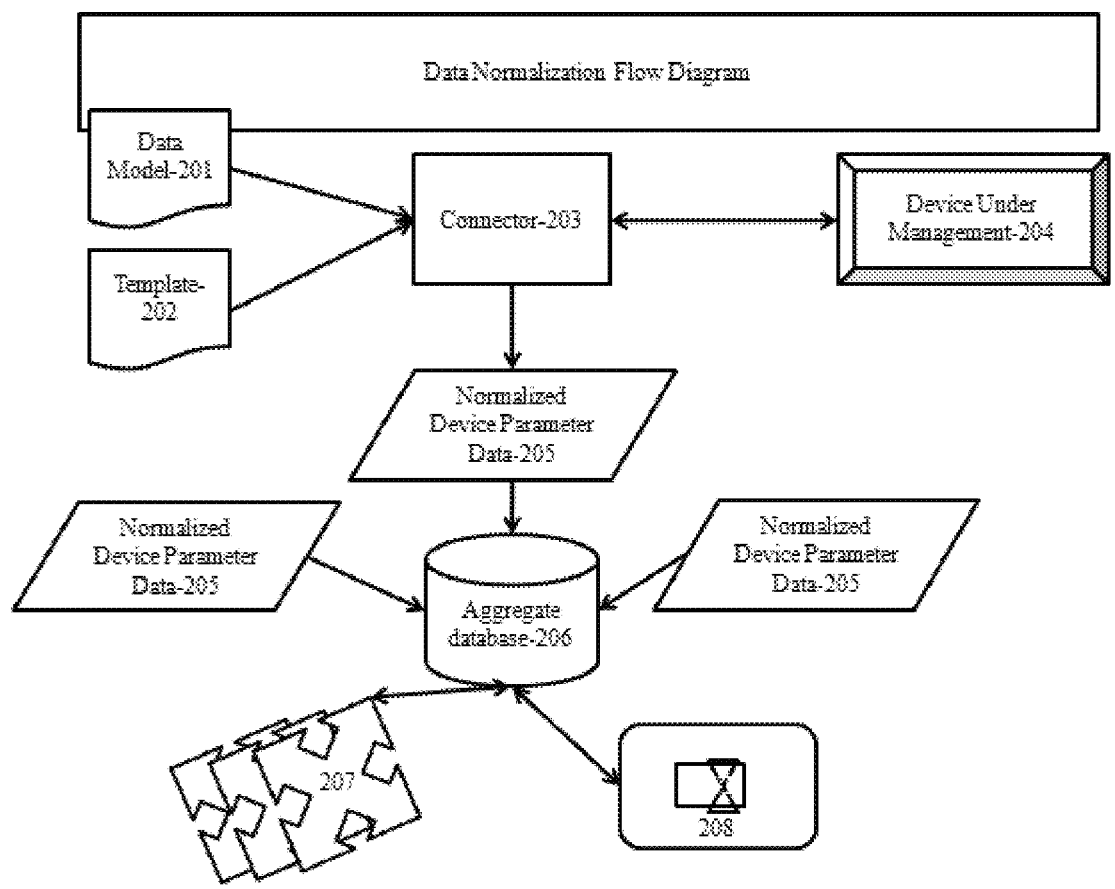
FIG. 2 illustrates data normalization work flow according to an embodiment.

FIG. 2 illustrates data normalization according to an embodiment. Data model 201 comprises data-modeling language instrumental in creating an abstract data-model for a device-class (e.g. Medical CT, Medical MRI, Printers, and UPS etc.). The data-model contains a list of device-class parameters, their types, whether read-only or read/write, and synchronous or asynchronous access and propagation, among other things.

Template 202 is created to access data-model parameters for a particular device model. The template contains a mapping from the data-model parameters to one or more connectors, specifying the connector name, address/index within the connector space, and processing instructions to read/write each parameter in the data-model for the particular device model.

Connectors 203 are available for each data-access method such as a network protocol (e.g. SNMP, HTTP), which can read/write device parameters based on information in the template for a particular device model.

Parameters for each device under management 204 are either polled periodically or on-demand. In addition to periodic or on-demand polling, data can be collected from data sources, asynchronously.

The abstract data-model now contains <name, value> tuples for each instance of a device belonging to device-class. These tuples (names) are necessarily normalized 205 for all devices belonging to a device-class, based on the definition of the data-model for the device-class.

The normalized data for all devices in a device-class, and across device-classes, is now aggregated into a schema-less data-base 206 to be stored as <name, value> tuples.

The normalized data stored in the data-base 206 is processed by a set of device-model independent, but device-class specific, workflows 207 to add metadata and derived data to the extracted device parameter data.

A set of configurable widgets 208 to display device-data and associated meta-data/derived-data in different forms (graphs, charts, tables etc.) complete the canonical viewing of the data.

An embodiment includes a computer implemented method comprising aggregating data from a plurality of devices and applications in a data aggregation server capable of communicating and aggregating the said data over a wired or wireless network. The method further includes, in a data normalization engine, normalizing data from a plurality of devices and applications. And additionally, combining the aggregated and normalized data, and displaying the combined data in a display compatible format through a presentation platform comprising a graphical user interface.

The method further includes abstracting a plurality of classes of devices via a data modeling language. The said abstracting comprises abstracting at least one of medical CT scanners, medical MRI machines, printers, and UPS stations.

Figure 3:
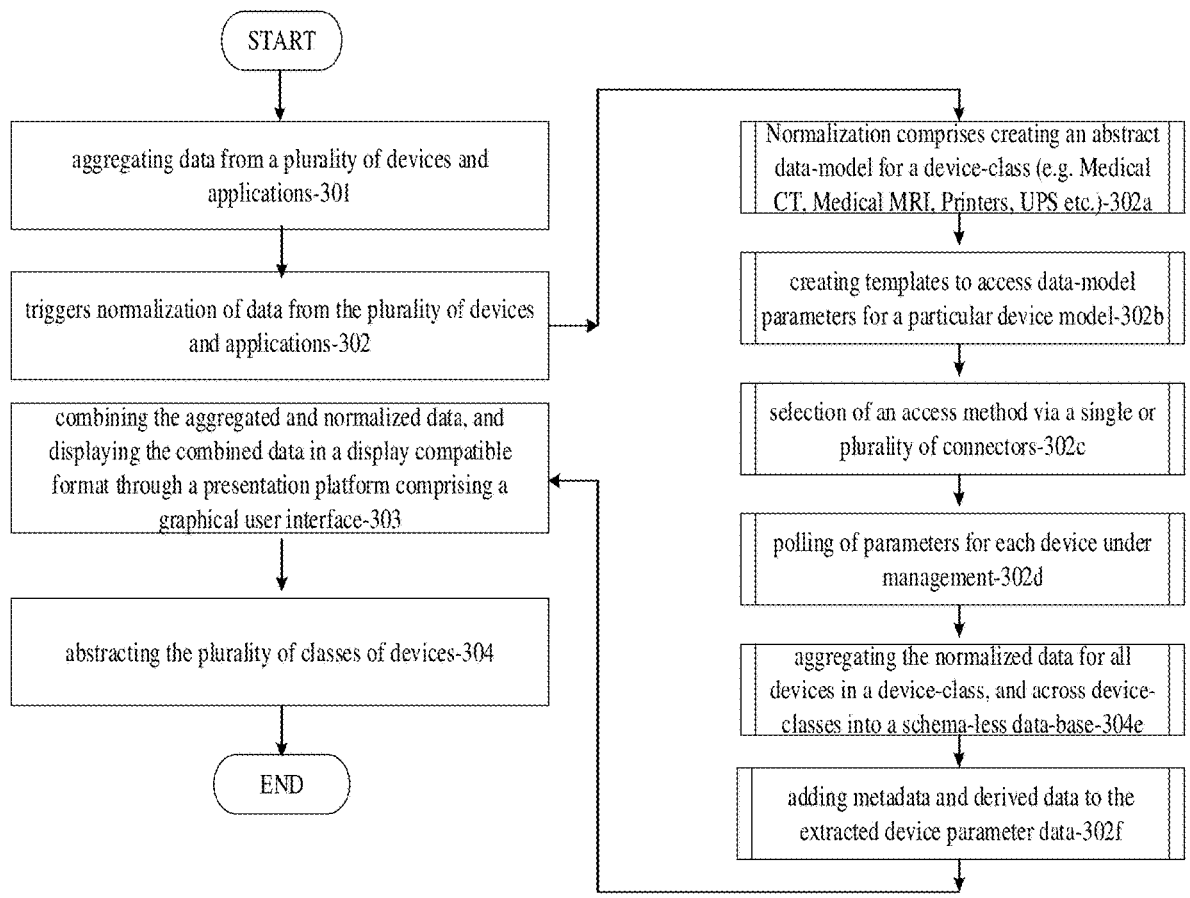
FIG. 3 illustrates the work flow according to an embodiment.

FIG. 3 illustrates the work flow according to an embodiment. Step 301 includes aggregating data from a plurality of devices and applications. Step 302 triggers normalization of data from the plurality of devices and applications. Normalization comprises generating an abstract data-model for a device-class (e.g. Medical CT, Medical MRI, Printers, UPS etc.), as shown in step 302a. Step 302b comprises generating templates to access data-model parameters for a particular device model. Step 302c comprises selection of an access method via a single or plurality of connectors. Step 302d includes polling of parameters for each device under management. Step 302e includes aggregating the normalized data for all devices in a device-class, and across device-classes into a schema-less data-base. Step 302f includes adding metadata and derived data to the extracted device parameter data. Step 303 includes combining the aggregated and normalized data, and displaying the combined data in a display compatible format through a presentation platform comprising a graphical user interface. And Step 304 includes abstracting the plurality of classes of devices.

In an embodiment, the said normalizing of data includes extracting at least one of a log file data, an SNMP data and HTTP data from each of a plurality of connected devices via a plurality of extensible connectors. The method further includes mapping data-model parameters to variables in device models via a plurality of pre-created templates. And extracting the data model parameters mapped to the said variables in the said device models via the said plurality of extensible connectors.

Figure 4:
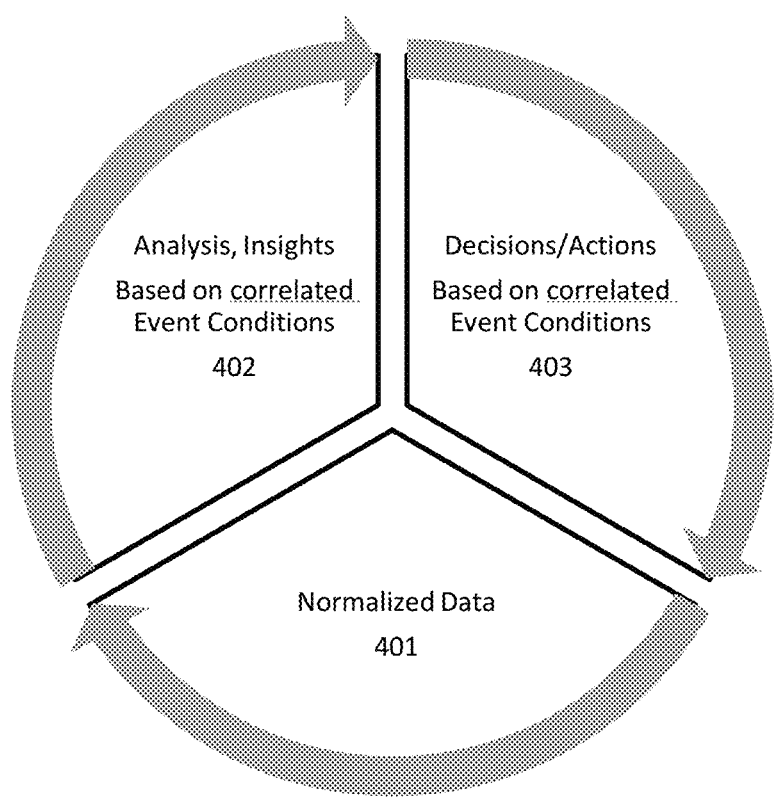
FIG. 4 is a simplified illustration of an embodiment.

FIG. 4 is a simplified illustration of an embodiment. Preferably the system and method are configured to loop through a return path in three steps or stages: Normalization of data→Analysis and insights→Decision/Action in real time.

The normalization 401 entails data collection and normalization across a vast and disparate amount of data sources. Normalization includes normalization across proxy devices, legacy protocols, devices, machines, and sensors, things across locations and user types, and device clouds among others.

According to an embodiment, if the data is coming through an associated or recognized proxy, the data is normalized at the collection point or at an edge. According to an alternate embodiment, if the data is coming through $3^{rd}$ party sources or channels then normalization is implemented at an associated server. Additionally, there could be instances of the data coming through different sources as well—e.g. Mobile, the associated proxy, through web services etc. In such instances, post processing and normalization is done at the associated server. Variations, modifications, permutations, and combinations are possible, as would be apparent to a person having ordinary skill in the art.

The Analysis 402 is based on a correlated event or events, a correlated condition or conditions, and a correlated trend or trends across these disparate sources of data, analyzed via Device Internet of Things (IOT) stacks and gateways.

This is followed by Decisions/Actions 403 as a return path or closed loop back to the machines/sensors and or other devices/applications. Decisions are taken in real-time based on information obtained from data sources, like the web, social media, etc. and communication devices, in real-time.

Prior art systems offer sequential steps and the time taken to go through these steps are very slow and by the time a decision is taken, the data/conditions may have changed leading to wrong decisions. Also, those that offer such solutions tend to be silos of a single context or vendor or type of device. The decision making is based on analysis of conditions across multiple sources that need to be correlated and done in real-time. Embodiments disclosed enable this correlation and further enable automation of the disclosed systems and methods such that preferred embodiments are configured to react in real-time, depending upon prevailing conditions.

Since various possible embodiments might be made of the above invention, and since various changes might be made in the embodiments above set forth, it is to be understood that all matter herein described or shown in the accompanying drawings is to be interpreted as illustrative and not to be considered in a limiting sense. Thus it will be understood by those skilled in the art that although the preferred and alternate embodiments have been shown and described in accordance with the Patent Statutes, the invention is not limited thereto or thereby.

Embodiments disclosed enable seamless communication across device and machine models, applications, brands, operating systems, networks, and protocols. Embodiments disclosed further enable real-time data collection and normalization, real-time analysis based on events, conditions, and trends across disparate data sources, and real-time decision making/action as a return path or closed loop back to the machines/sensors and or other devices/applications. Embodiments disclosed also enable the return path or the control path for configuration, control and diagnostics. Preferred embodiments include a correlation capability across the multiple sources in real-time analysis and decision making. Embodiments disclosed also enable working across multiple silos.

The figures illustrate the architecture, functionality, and operation of possible implementations of systems and methods according to various embodiments of the present invention. It should also be noted that, in some alternative implementations, the functions noted/illustrated may occur out of the order noted in the figures. For example, two blocks shown in succession may, in fact, be executed substantially concurrently, or the blocks may sometimes be executed in the reverse order, depending upon the functionality involved.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In general, the steps executed to implement the embodiments of the invention, may be part of an automated or manual embodiment, and programmable to follow a sequence of desirable instructions.

The present invention and some of its advantages have been described in detail for some embodiments. It should be understood that although some example embodiments of the data aggregation, normalization and presentation system and method are described with reference to specific device types and applications, the computer implemented system and method is highly reconfigurable, and embodiments include reconfigurable systems that may be dynamically adapted to be used in other contexts as well. It should also be understood that various changes, substitutions and alterations can be made herein without departing from the spirit and scope of the invention as defined by the appended claims. An embodiment of the invention may achieve multiple objectives, but not every embodiment falling within the scope of the attached claims will achieve every objective. Moreover, the scope of the present application is not intended to be limited to the particular embodiments of the process, machine, manufacture, and composition of matter, means, methods and steps described in the specification. A person having ordinary skill in the art will readily appreciate from the disclosure of the present invention that processes, machines, manufacture, compositions of matter, means, methods, or steps, presently existing or later to be developed are equivalent to, and fall within the scope of, what is claimed. Accordingly, the appended claims are intended to include within their scope such processes, machines, manufacture, compositions of matter, means, methods, or steps

We claim:

1. A computer automated system comprising:
   a processing unit;
   a memory element coupled to the processing unit;
   an embedded data collection stack;
   wherein the computer automated system is configured to, in real-time:
   automatically aggregate device behavior data over a network via the embedded data collection stack from a plurality of device classes, wherein the plurality of device classes comprise a single or plurality of proxy devices, legacy protocols, devices, applications, machines, and sensors across locations;
   abstract the plurality of device classes to generate an abstract device model;
   automatically normalize the aggregated device behavior data from the plurality of device classes;
   wherein automatic normalization comprises normalization at a collection point or at an edge from an associated or recognized proxy, and normalization at an associated server from an unassociated or unrecognized proxy;
   automatically canonicalize the normalized and aggregated device behavior data, wherein canonicalization comprises adding meta-data and derived data to aggregated device behavior data from each of the plurality of device classes;
   automatically analyze the canonicalize device behavior data based on a correlated event or events, and a correlated condition or conditions, across the plurality of device classes;
   and
   based on the analyzed device behavior data, automatically combine the normalized and aggregated device behavior data, and display the combined normalized and aggregated device behavior data in a display compatible format.

2. The computer automated system of claim 1 wherein the abstracting of the plurality of device classes comprises abstracting a plurality of sensors, and connected devices comprising medical CT scanners, medical Mills, printers, and UPS systems.

3. The computer automated system of claim 1 wherein, in the normalizing of said device behavior data from the plurality of device classes, the computer automated system is further caused to:
   via a plurality of extensible connectors, extract a log file data, or a proprietary or standard protocol comprising SNMP data and HTTP data from each of a plurality of connected devices.

4. The computer automated system of claim 3 wherein the system is further configured to:
   map device behavior data model parameters to variables in device models via a previously created plurality of templates; and
   wherein the plurality of extensible connectors are further caused to extract the device behavior data model parameters mapped to the variables in the device models.

5. The computer automated system of claim 4 wherein the computer automated system is configured to:
   store each device behavior data model parameter as a name value pair in a no-schema database.

6. The computer automated system of claim 1 wherein:
   said adding meta-data and derived data to the aggregated device behavior data from each of the plurality of device classes in canonicalization of the normalized and aggregated device behavior data comprises adding the meta-data and the derived data via a single or plurality of workflows.

7. The computer automated system of claim 1 wherein the computer automated system is configured to:
   display the device behavior data in a plurality of different forms wherein the plurality of different forms comprises at least one of a graph, a chart, and a table.

8. The computer automated system of claim 7 wherein the graph, chart and table are configured to show the device behavior data relevant to each device class.

9. The computer automated system of claim 1 wherein the analysis based on the correlated event or events, and the correlated condition or conditions, across the plurality of device classes, comprises analysis via a single or plurality of Device Internet of Things (IOT) stacks and gateways; and wherein based on the analysis, the computer automated system is configured to implement a single or plurality of decisions, in real-time, in a return path or closed loop, on a plurality of machines, sensors, devices and applications.

10. The computer automated system of claim 1 further comprising a mobile device.

11. In a computer automated system comprising a processing unit coupled to a memory element, an embedded data collection stack, and having instructions encoded thereon, a method comprising, in real-time:
automatically aggregating device behavior data over a network via the embedded data collection stack from a plurality of device classes, wherein the plurality of device classes comprise a single or plurality of proxy devices, legacy protocols, devices, applications, machines, sensors and things across locations;
abstracting the plurality of device classes to generate an abstract device model;
automatically normalizing the aggregated device behavior data from the plurality of device classes;
wherein automatic normalization comprises normalization at a collection point or at an edge from an associated or recognized proxy, and normalization at an associated server from an unassociated or unrecognized proxy;
automatically canonicalizing the normalized and aggregated device behavior data, wherein canonicalization comprises adding meta-data and derived data to aggregated device behavior data from each of the plurality of device classes;
automatically analyzing the canonicalized device behavior data based on a correlated event or events, a correlated condition or conditions, and a correlated trend or trends across the plurality of device classes; and
based on the analyzed device behavior data, automatically combining the normalized and aggregated device behavior data, and displaying the combined normalized and aggregated device behavior data in a display compatible format.

12. The method of claim 11 wherein the abstracting of the plurality of classes of the plurality of device classes comprises abstracting a plurality of sensors, and connected devices comprising medical CT scanners, medical Mills, printers, and UPS systems.

13. The method of claim 11 wherein the normalizing of aggregated device behavior data further comprises:
extracting a log file data, or a proprietary or standard protocol comprising at least one of an SNMP data and HTTP data from each of a plurality of connected devices via a plurality of extensible connectors.

14. The method of claim 13 further comprising:
mapping device behaivor data model parameters to variables in device class models via a plurality of pre-created templates; and
extracting the device behavior data model parameters mapped to the variables in the device class models via the plurality of extensible connectors.

15. The method of claim 14 further comprising:
storing each device behaivor data model parameter as a name value pair in a no-schema database.

16. The method of claim 11 wherein:
said adding meta-data and derived data to the aggregated device behavior data from each of the plurality of device classes in canonicalization of the normalized and aggregated device behavior data comprises adding the meta-data and the derived data via a single or plurality of workflows.

17. The method of claim 11 further comprising:
displaying device behavior data in a plurality of forms wherein the said plurality of forms comprises at least one of a graph, a chart, and a table.

18. The method of claim 17 wherein the said graph, chart and table are configured to show behavior data relevant to each device class.

19. The method of claim 11 wherein the analyzing of device behavior data based on the correlated event or events, and the correlated condition or conditions, across the plurality of device classes comprises:
analyzing via a single or plurality of Device Internet of Things (IOT) stacks and gateways; and
based on the analyzing via the single or plurality of Device Internet of Things (IOT) stacks and gateways, implementing a single or plurality of actions, in real-time, in a return path or closed loop, on a single or plurality of machines, sensors, devices or applications.

20. In a computer automated system comprising a processing unit coupled to a memory element and having instructions encoded thereon, a method comprising, automatically in real-time:
via an embedded data collection stack comprised in the computer automated system, aggregating device behavior data over a network from a plurality of device classes, wherein the plurality of device classes comprise a single or plurality of proxy devices, legacy protocols, devices, applications, machines, sensors and things across locations;
normalizing the aggregated device behavior data from the plurality of device classes, wherein the normalizing comprises:
generating an abstract device model for the plurality of device classes;
extracting device model parameters via the generated abstract device model;
polling the extracted device model parameters for each device class type from the plurality of device classes;
wherein the normalizing of the aggregated device behavior data from the plurality of device classes further comprises normalization at a collection point or at an edge from an associated or recognized proxy, and normalization at an associated server from an unassociated or unrecognized proxy;
canonicalizing the normalized and aggregated device behavior data which comprises adding meta-data and derived data to the extracted device model parameters;
analyzing the canonicalized device behavior data based on a correlated event or events, and a correlated condition or conditions, across the plurality of device classes; and
based on the analyzing:
implementing a single or plurality of actions, in real-time, in a return path or closed loop, on a single or plurality of machines, sensors, devices or applications;
and combining the normalized and aggregated device behavior data, and displaying the combined normalized and aggregated device behavior data in a display compatible format.

21. A mobile wireless communication device comprising:
a processing unit;
a memory element coupled to the processing unit;
an embedded data collection stack;
encoded instructions that configure the mobile device to, automatically in real-time:
  aggregate device behavior data over a network via the embedded data collection stack from a plurality of device classes, wherein the plurality of device classes comprise a single or plurality of proxy devices, legacy protocols, devices, applications, machines, sensors and things across locations;
  abstract the plurality of device classes to generate an abstract device model;
  normalize the aggregated device behavior data from the plurality of device classes;
  wherein automatic normalization comprises normalization at a collection point or at an edge from an associated or recognized proxy, and normalization at an associated server from an unassociated or unrecognized proxy;
  canonicalize the normalized and aggregated device behavior data, wherein canonicalization comprises adding meta-data and derived data to aggregated device behavior data from each of the plurality of device classes;
  analyze the canonicalized device behavior data based on a correlated event or events, a correlated condition or conditions, and a correlated trend or trends across the plurality of device classes;
  and
  based on the analyzed device behavior data, combine the normalized and aggregated device behavior data, and display the combined normalized and aggregated device behavior data in a display compatible format.

22. The mobile wireless communication device of claim 21 wherein the device is further configured to:
  based on the analyzed device behavior data, trigger a single or plurality of actions, in real-time, in a return path or closed loop, on the single or plurality of machines, sensors, devices or applications.

* * * * *